INVENTOR
WILLIAM P. KANE
BY *Hoge T. Sutherland*
ATTORNEY

United States Patent Office

3,784,711
Patented Jan. 8, 1974

3,784,711
SURFACE TREATED CHEESE PACKAGE AND METHOD
William P. Kane, Bon Air, Va., assignor to E. I. du Pont de Nemours and Company, Wilmington, Del.
Filed Sept. 2, 1971, Ser. No. 177,368
Int. Cl. B65b 25/06
U.S. Cl. 426—130                                    2 Claims

ABSTRACT OF THE DISCLOSURE

A cheese package comprising a piece of cheese wrapped in a polyester film. The inner surface of such film, which contacts the cheese, is uncoated and the outer surface thereof, which does not contact the cheese, is coated with a vinylidene chloride copolymer containing at least an ester wax and a solid particulate. The uncoated inner surface of the film is treated, by electrical discharge, to improve adhesion between such inner surface and the cheese which is extruded onto, or positioned in contact with, this film surface in molten form.

BACKGROUND OF THE INVENTION

(1) Field of the invention

This invention is a cheese package and, more particularly, is a package comprising a polyester film coated on one side only and treated on the other side so that this side, which contacts the cheese, will adhere to it, temporarily, but will pull free when the package is opened.

(2) Description of the prior art

It is known to package individual slices of cheese in coated wrapping materials and laminates.

U.S. Pat. 2,759,308 to Nawrocki, for example, teaches an apparatus for individually wrapping a slice-like slab of cheese in a transparent, pliant wrapper of that class of wrapping films which are susceptible of being heat sealed under heat and/or pressure, such as a laminated cellophane and polyethylene, Pliofilm, saran or certain other vinyl chlorides.

U.S. Pat. 2,711,966 to Hofrichter discloses a synthetic film comprising a vinylidene chloride copolymer and ester wax, a long-chain polar compound and calcium carbonate. Such film fulfills a number of requirements demanded of a packaging film to a high degree; however, unmodified vinylidene chloride copolymer films or coatings are deficient in that they tend to stick to the molten cheese and when the cooled cheese is removed from the package, the coating is pulled with it.

This invention provides a packaging film having an inner surface which is uncoated so that there is no problem of a coating pulling from the film, but which is treated so that it will adhere, loosely, to molten cheese and then will release the cheese after it is cool and the package is opened.

SUMMARY OF THE INVENTION

The package, and packaging material, of this invention provides a means for releasably adhering a piece of cheese to an uncoated surface of a polyester film which surface has been treated, by electrical discharge, whereby it will adhere to the cheese when it contacts it in a molten state but which will release the cheese under normal use conditions when the package is opened.

It is known to use polyester films in packaging food. Such films may, for various use applications, be coated, uncoated or may be combined with other materials depending upon the particular need. Generally, such films are coated whereby they have imparted to them certain properties such as moisture resistance or machinability or other properties.

The foremost deficiency in using coated films in the packaging of items such as cheese is that in the "slice packaging" of hot melt-extruded processed cheese, there results periodic failure wherein the polymer coating adjacent the cheese delaminates from the film when the cheese is removed from the individual slice package. It is believed that this results from a reaction between the hot fat contained in the processed cheese and certain of the polymer coating ingredients. The film of this invention solves this delamination problem by using as the packaging material a polyester film that has been coated only on one side, which side is remote from the cheese. Such polyester film easily withstands the sudden transition from the high temperature of the hot cheese melt to the cooling temperature upon being quenched.

The film side that contacts the cheese is treated electrostatically or by flame treatment so that there is sufficient adhesion developed between the molten cheese and the uncoated film surface to meet normal packaging demands. This essentially involves keeping the overwrap in position around the cheese and from prematurely opening by its own internal forces. Such adhesion must not be great enough to cause the cheese slice to strongly adhere to the uncoated polyester film surface upon being opened. Stated another way, as the package is opened it is important that the adhesion level of the cheese to the uncoated surface of the film be such that the cheese can be pulled from that surface without breaking, but the adhesion before the opening takes place should be such that the cheese will stay in packaged condition.

Accordingly, in the present invention there is provided a film of an organic thermoplastic polymeric material having a vinylidene chloride copolymer coating on one surface and the other surface of which is treated whereby it is adapted to releasably adhere to cheese which is in contact with it; first in a molten state, then in a solid form.

In another embodiment, this invention is a cheese package consisting of cheese wrapped in this novel film, with the treated, uncoated, surface of the film in contact with the cheese to releasably hold it thereagainst and with the coated surface not in contact with the film serving other needed functions in such a package.

In the present invention, there is further provided a method of making the novel film of this invention which comprises coating one surface of a film of organic thermoplastic polymeric material with the vinylidene chloride copolymer and treating the other surface to promote the releasable adhesion thereof to cheese.

The nature and advantages of the laminar structure of the present invention will be more clearly understood by the following description thereof and the several views illustrated in the accompanying drawing wherein like reference characters refer to the same parts throughout the several views.

DESCRIPTION OF THE PREFERRED EMBODIMENTS

Figure 1:
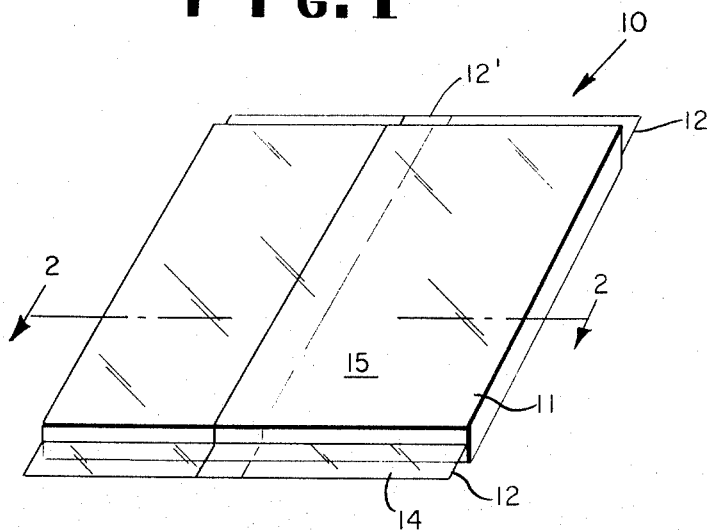
FIG. 1 is a perspective view showing a cheese package of this invention with polyester wrapping film wrapped about an individual cheese slice and with the inner surface of such film in abutting contact with and adhered to such cheese slice.
Figure 2:
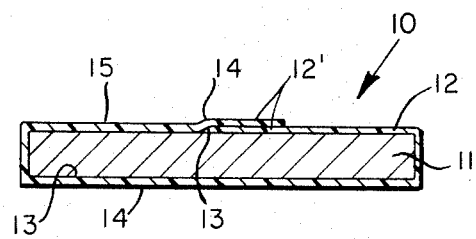
FIG. 2 is a cross-sectional view showing the package of FIG. 1.

Referring to the drawing, there is shown a novel package 10 of this invention.

Such package 10 consists of a slice-like slab of cheese 11 contained in a wrapper 12, in the form of a novel plastic film, which is overwrapped around the cheese in a manner so that at least parts 12' of the film 12 are in overlapping relationship with each other.

The plastic film 12 used as a wrapping material in the package 10 is preferably polyester film made from polyethylene terephthalate, the polymer formed by the condensation reaction of ethyl glycol and terephthalic acid. A method of making such film is shown in U.S. Pat. 2,465,319 to Whinfield and Dickson.

At the time the cheese is wrapped in the film, it is in a molten condition; after being wrapped, the cheese is at room temperature or may be refrigerated, preferably. The wrapper provides a means of packaging the individual slice of cheese which, when opened, by unwrapping the film from around it is not affected (i.e., broken) due to the unwrapping forces.

It is important then that the film has a number of varied properties. For example, it must have good dimensional stability and durability; have proper stiffness; provide adequate machine runnability and be able to withstand the effects of molten cheese being extruded or placed adjacent its inner surface and, after chilling, the cheese must not pull any part of this inner surface with it when the cheese is pulled from it due to the bond set up between the molten cheese and the inner surface of the film.

Accordingly, to accomplish these desired properties and provide a film of great utility in packaging cheese, the inner surface 13 of the film is treated prior to packaging the cheese in it in a manner to be described, but is not coated so that there are no problems of the coating being delaminated from the inner surface and pulled with the cheese from that surface upon the package being opened. In short, there is no coating to be pulled from such surface.

The outer surface 14 of the film 12, the surface which is removed from the cheese and which does not contact it at any time, is preferably coated with a coating composition 15 comprising the following: vinylidene chloride copolymer; carnauba wax, 3%; maleic acid, 1.5%; and steatite talc, 0.5%; these percentages being based on the polymer weight.

The vinylidene chloride copolymer is obtained by polymerizing a mixture of between about 80 and about 96.5 parts by weight of vinylidene chloride and between about 3 and about 19.9 parts by weight of at least one other monomer copolymerizable therewith such as acrylonitrile or alkyl esters of either acrylic or methacrylic acids having from 1 to 18 carbon atoms in the alkyl group thereof, phenyl methacrylate, cyclohexyl methacrylate, p-cyclohexylphenyl methacrylate, methacrylonitrile, methyl vinyl ketone, and vinyl chloride with between about 0.1 and about 5 parts by weight of either itaconic or acrylic acid. The above coating is generally referred to as a saran-type coating and is usually applied as an aqueous solution or in an organic solvent in an amount to provide a coating weight between about 1 and about 6 grams per square meter of coated film surface.

In accordance with the present invention, the surface 14 is coated with the vinylidene chloride copolymer coating 15 primarily to promote proper machinability.

The coating solutions are made up following essentially the normal procedures with solids content of the coating solution being in the order of 10 to 25%. A convenient solvent system comprises mixtures of tetrahydrofuran with toluene. A coating solution can be made, for example, by charging the vinylidene chloride copolymer, the wax and the particulate in the required amount of solvent mixture of tetrahydrofuran and toluene into a reaction vessel and heating with stirring until the solution is complete. Alternately, the various ingredients can be dissolved in portions of the solvent and the several solutions can then be mixed together along with the particulate to provide the desired coating solution. The coatings thus prepared can be applied by conventional coating methods to the appropriate base sheet.

In the preferred embodiment of this invention, the vinylidene chloride copolymer contains itaconic acid as the olefinically unsaturated carboxylic acid and the copolymer is dissolved in a solvent containing from 50 to 70% of tetrahydrofuran and 30 to 50% of toluene. The preferred naturally occurring wax is carnauba used in amounts between 3.0 and 4.5% based on the weight of the vinylidene chloride copolymer. The preferred particulate material is steatite talc in amounts between 0.3 and 0.5 part by weight of the copolymer.

Among naturally occurring esters, waxes which are operable in the composition of the invention are such waxes as carnauba, ouricury or raffia wax. The essential requirement is that they have a melting point of at least 75° C. and a hardness of at least 0.25 kg./mm.$^2$ at 60° C. as measured by ASTM D1475–62T, method B.

The solid particulate used as slip agent should be insoluble in the coating and in the coating solvent. Suitable materials include, for example, steatite talc in amounts between 0.1 and 1.0 part, bentonite clay in amounts between 0.05 and 0.2, mica in amounts between 0.5 and 2.0 parts by weight, in all cases based on 100 parts by weight of the vinylidene chloride copolymer. Below the respective lower limits the slip of the film is inadequate, while above the upper limits the film becomes hazy.

The vinylidene chloride copolymer coating provides improved moisture proofing properties in the polyester film material coated therewith. The general procedure for applying the coating to the film is to dissolve the dispersed copolymer in a suitable organic solvent, apply the solution to the film surface such as by roll application and then dry the film coating.

The preferred method of treating the inner surface 13 of film 12 in order to make it releasably bond to the cheese 11 is by subjecting this surface to electrostatic or spark discharge. This may be accomplished conveniently with a Lepel High Frequency Laboratory Model HFSG high frequency spark generator by passing the surfaces to be treated about 0.04 inch from the stationary high voltage electrodes of the Lepel generator supplied with approximately 1.3 amperes (R.M.S.) of current. The film surface to be treated may be advanced at speeds varying from 10 to 200 feet per minute to provide an effective time of treatment of about $4 \times 10^{-4}$ second.

Another method of treating such inner surface 13 is to continuously expose the surface of moving film 12 to a thermally conductive surface maintained at a temperature sufficiently low to reduce the temperature of the film to within 75° C. while simultaneously exposing the surface to a flame supplied by a gaseous mixture of propane, oxygen and nitrogen. The flame which emerges from a suitable burner device is composed of a primary envelope comprising the luminous, pale blue, conical inner portion which is adjacent to the burner orifice and the secondary envelope comprising the remainder of the flame. When a rectangular shaped burner orifice is employed the primary envelope is wedge-shaped in cross-section. The surface is passed through the primary envelope of the flame at a distance from the burner orifice sufficient for maintaining a self-sustaining flame. The gaseous constituents for combustion are propane, oxygen, and nitrogen. The proportions of these constituents that are supplied to the burner are critical for the successful flame treatment of the vinylidene chloride copolymer coated surface. It has been observed that the ratio of the amount of hydrocarbon fuel present in the gaseous mixture supplied to the burner-to-the amount of hydrocarbon fuel necessary for stoichiometric combustion, and the ratio of the total amount of oxygen supplied to the burner-to-the total amount of non-fuel (oxygen and nitrogen) components must be controlled within definite limits. Specifically, the ratio of the amount of hydrocarbon fuel present in the gaseous mixture-to-the amount of hydrocarbon fuel necessary for stoichiometric combustion must be between 0.85 and 1.05. The oxygen ratio of the non-fuel components of the gaseous mixture must also be maintained within relatively narrow limits. Satisfactory performance of the treatment is achieved using an oxygen ratio between 0.25 and 0.29. This insures the use of a flame that is neither oxidizing nor reducing in its action. Exposure time to the flame for operable performance may be from 0.001 second to 0.050 second.

I claim:

1. A package comprising cheese overwrapped in a flexible film wherein the film comprises:
   polyethylene terephthalate film having an inner surface adjacent to the cheese and a dissimilar outer surface;
   the inner surface being uncoated but being surface treated by electrical discharge sufficient to releasably adhere said treated inner surface to said cheese in such a manner that the cheese will not be affected due to the unwrapping of the overwrapped film; and
   the outer surface being coated with a vinylidene chloride copolymer coating containing at least an ester wax and a slip agent, said slip agent having a solid particulate insoluble in the coating.

2. An overwrapped method of making a cheese package including the steps of:
   treating an inner surface of polyethlene terephthalate film by electrical discharge sufficient to releasably adhere said treated inner surface to said cheese in such a manner that the cheese will not be affected due to the unwrapping of the overwraped film, such inner surface being uncoated prior to treatment;
   extruding cheese in a molten condition onto such treated inner surface of the film;
   overwrapping the film around the cheese to form a cheese package; and
   cooling the molten cheese to a temperature at which it is solidified and in which solidified state it releasably adheres to such treated inner surface of the film.

References Cited
UNITED STATES PATENTS

| | | | |
|---|---|---|---|
| 3,274,004 | 9/1966 | Curler et al. | 99—171 LP |
| 3,536,501 | 10/1970 | Work. | |
| 2,956,671 | 10/1960 | Cornwell. | |
| 2,606,120 | 8/1952 | Cherepow et al. | 99—178 |
| 3,297,782 | 1/1967 | Barkis et al. | |
| 3,326,742 | 6/1967 | Shephard | 161—231 X |
| 3,222,188 | 12/1965 | Feldman | 99—171 LP |
| 2,348,689 | 5/1944 | Abrams et al. | 99—178 |
| 2,955,045 | 10/1960 | Coffey et al. | 99—178 |
| 2,882,169 | 4/1959 | Kielsmeier et al. | 99—178 |
| 2,759,308 | 8/1956 | Nawrocki. | |

FRANK W. LUTTER, Primary Examiner

S. L. WEINSTEIN, Assistant Examiner

U.S. Cl. X.R.

156—272; 161—231, 256, 411; 204—168, 312; 426—234, 414